United States Patent
Hobbs

(10) Patent No.: US 7,385,717 B2
(45) Date of Patent: Jun. 10, 2008

(54) PRINT PROCESSING SYSTEM AND METHOD WITH PRINT JOB ADVERTISING

(75) Inventor: George Bradley Hobbs, Star, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 976 days.

(21) Appl. No.: 09/734,295

(22) Filed: Dec. 11, 2000

(65) Prior Publication Data

US 2002/0080384 A1 Jun. 27, 2002

(51) Int. Cl.
*G06F 15/00* (2006.01)
*G06Q 30/00* (2006.01)

(52) U.S. Cl. ........................................ 358/1.15; 705/14
(58) Field of Classification Search ............... 358/1.15; 375/240.01; 705/402, 14, 9, 37; 709/220, 709/231; 455/515, 522; 707/3, 100
See application file for complete search history.

(56) References Cited

U.S. PATENT DOCUMENTS

| | | | |
|---|---|---|---|
| 5,467,434 A | 11/1995 | Hower, Jr. et al. | |
| 5,513,254 A * | 4/1996 | Markowitz | 379/100.17 |
| 5,805,810 A | 9/1998 | Maxwell | |
| 5,970,475 A | 10/1999 | Barnes et al. | |
| 6,154,733 A | 11/2000 | Pierce et al. | |
| 6,327,580 B1 * | 12/2001 | Pierce et al. | 705/401 |
| 6,404,994 B1 * | 6/2002 | Kawai et al. | 399/6 |
| 6,738,155 B1 * | 5/2004 | Rosenlund et al. | 358/1.15 |
| 6,891,635 B2 * | 5/2005 | Dutta | 358/1.15 |
| 2001/0002204 A1 * | 5/2001 | Jebens et al. | 375/240.01 |
| 2001/0025274 A1 * | 9/2001 | Zehr et al. | 705/402 |

FOREIGN PATENT DOCUMENTS

| | | |
|---|---|---|
| EP | 1045323 A2 | 10/2000 |
| WO | WO 00/03342 | 1/2000 |
| WO | WO00/72203 A1 | 11/2000 |

OTHER PUBLICATIONS

U.S. Appl. No. 09/581,306 (in part) pp. 4-6,8,9 and 11.*

* cited by examiner

*Primary Examiner*—Saeid Ebrahimi

(57) ABSTRACT

A system and method of processing a print job of a customer and including advertising with the print job includes defining a network communication link between the customer and a print processing system controller having a plurality of advertisements registered therewith. The print processing system controller receives a data file for the print job from the customer via the network communication link and associates at least one of the advertisements with the print job based on the data file.

2 Claims, 7 Drawing Sheets

PRINT PROCESSING SYSTEM AND METHOD WITH PRINT JOB ADVERTISING

CROSS-REFERENCE TO RELATED APPLICATIONS

This application is related to Non-Provisional U.S. patent application Ser. No. 09/734,290, entitled "PRINT PROCESSING SYSTEM AND METHOD WITH INTERFACE ADVERTISING", filed on even date herewith, assigned to the assignee of the present invention, and incorporated herein by reference.

THE FIELD OF THE INVENTION

The present invention relates generally to print services and, more particularly, to a network system and method of processing a print job of a customer and including advertising with the print job.

BACKGROUND OF THE INVENTION

Typically, advertising is conducted for specific consumer segments in specific media forms. As such, an advertiser attempts to define a respective consumer segment to whom to target the advertising as well as an effective media form for conveying the advertising.

As one form of advertising, print advertising often accompanies printed material. Thus, establishing a nexus between the print advertising and the printed material is advantageous to the advertiser. For example, if a consumer creating and/or reading the printed material has an interest in an aspect of the printed material, then assumedly the consumer may have an interest in a subject matter of the print advertising.

An advertiser, therefore, can target print advertising to a consumer based on an aspect of accompanying printed material. Targeting print advertising to the consumer, however, is often difficult since the advertiser is not always aware of when printed material relevant to the subject matter of the print advertising is being printed.

Accordingly, a need exists for processing a print job of a customer and directing advertising to the customer. More particularly, a need exists for targeting advertising to the customer based on an aspect of the print job including a content of the print job.

SUMMARY OF THE INVENTION

One aspect of the present invention provides a method of processing a print job of a customer and including advertising with the print job. The method includes defining a print processing system controller having a plurality of advertisements registered therewith, defining a network communication link between the customer and the print processing system controller, receiving a data file for the print job from the customer at the print processing system controller via the network communication link, and associating at least one of the advertisements with the print job based on the data file for the print job.

Another aspect of the present invention provides a method of processing a print job of a customer and including advertising with the print job. The method includes defining a print processing system controller having a plurality of advertisements registered therewith, defining a network communication link between the customer and the print processing system controller, receiving a data file for the print job from the customer at the print processing system controller via the network communication link, processing the data file for the print job and determining from the data file a content of the print job, and associating at least one of the advertisements with the print job based on the content of the print job and a profile of the advertisements.

Another aspect of the present invention provides a system for processing a print job of a customer and including advertising with the print job. The system includes a print processing system controller configured to have a plurality of advertisements registered therewith. As such, the print processing system controller is adapted to receive a data file for the print job from the customer and associate at least one of the advertisements with the print job based on the data file for the print job.

In one embodiment, the present invention provides a system and method of processing a print job of a customer and including advertising with the print job. The system and method utilizes a network communication link between the customer and a controller of the system to receive a data file for the print job for the customer and register an advertisement with the controller.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
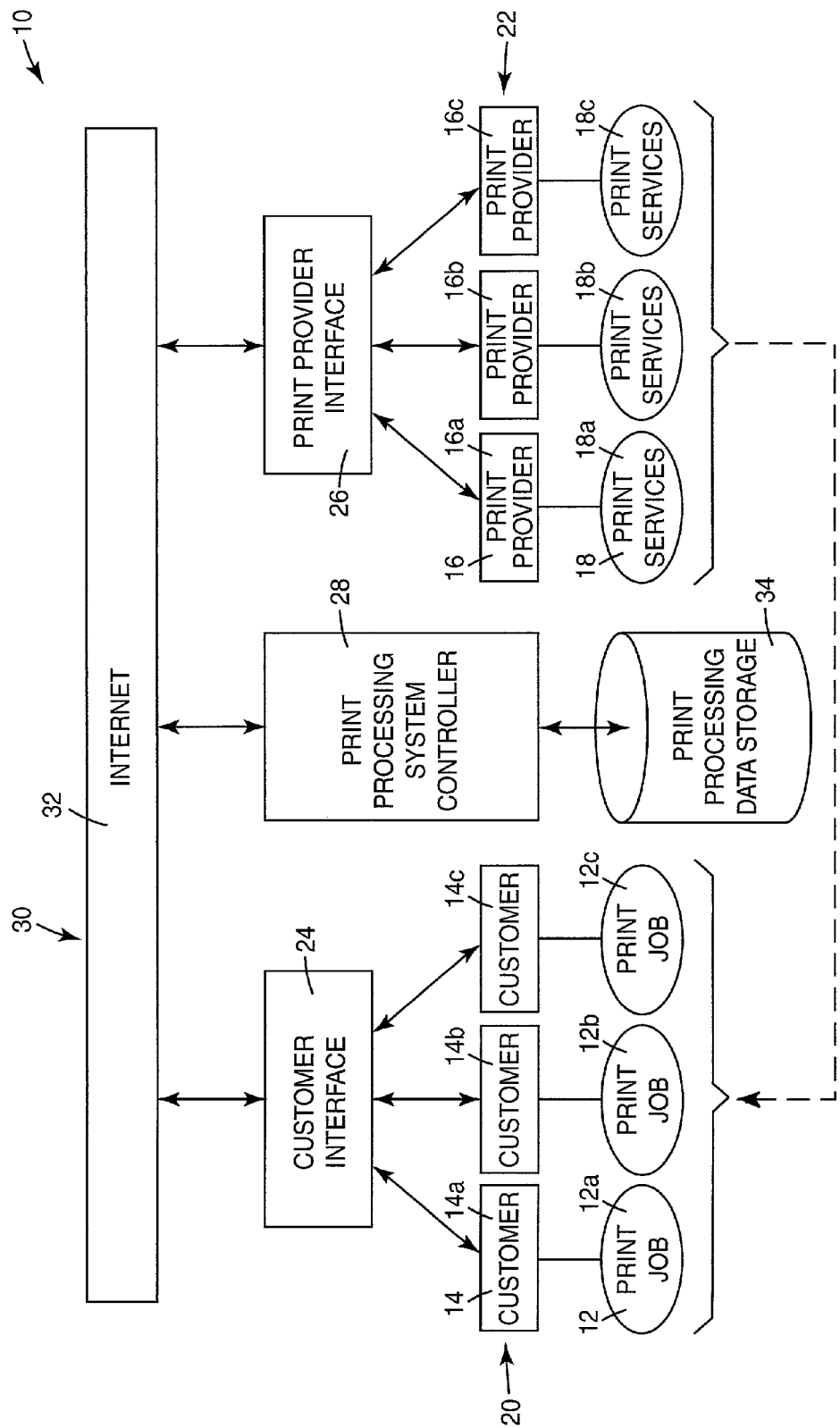
FIG. 1 is a block diagram illustrating one exemplary embodiment of a print processing system according to the present invention.

A network print processing system according to the present invention is illustrated generally at 10 in FIG. 1. Print processing system 10 facilitates processing of a print job 12 of a customer 14 before printing of print job 12 by a print provider 16 offering print services 18. In addition, print processing system 10 includes advertising with print job 12.

In one exemplary embodiment, print processing system 10 facilitates processing of a print job 12a, 12b, 12c of a customer 14a, 14b, 14c before printing of print job 12a, 12b, 12c by a print provider 16a, 16b, 16c offering print services 18a, 18b, 18c. For clarity, print job 12a, 12b, 12c, customer 14a, 14b, 14c, print provider 16a, 16b, 16c, and print services 18a, 18b, 18c are referred to hereinafter as print job 12, customer 14, print provider 16, and print services 18, respectively. As such, customer 14 may be one of a plurality of customers 20 each having a separate print job 12. Print provider 16 may be one of a plurality of print providers 22 each providing separate print services 18.

Print job 12, as used herein, is defined to include a piece of work requiring production and/or reproduction of printed matter. Customer 14, as used herein, is defined to include an entity or entities such as a consumer, an employee, or another print provider requesting or soliciting printing services, finishing services, delivery services, and/or other print processing services. Customer 14, therefore, includes any user of such printing, finishing, delivery, and/or other print processing services. Print provider 16, as used herein, is defined to include an entity or entities offering, providing, and/or assisting in printing services, finishing services, delivery services, and/or other print processing services. Print services 18, as used herein, is defined to include printing services, finishing services, delivery services, and/or other print processing services.

In one exemplary embodiment, print processing system 10 includes a customer interface 24, a print provider interface 26, and a print processing system controller 28. As such, customers 20 interact with customer interface 24 and print providers 22 interact with print provider interface 26. It is within the scope of the present invention for multiple customers 20 to each use the same customer interface 24 and/or for each customer 14 to have their own customer interface 24. In addition, multiple print providers 22 may each use the same print provider interface 26 and/or each print provider 16 may have their own print provider interface 26.

Customer interface 24, print provider interface 26, and print processing system controller 28 communicate with each other via a network communication link 30. Network communication link 30, as used herein, is defined to include an internet communication link such as an Internet communication link, an intranet communication link, or similar high-speed communication link. In one preferred embodiment, network communication link 30 includes an Internet communication link 32. While the following description only refers to Internet communication link 32, it is understood that the use of other network communication links is within the scope of the present invention. In addition, network communication link 30 may include a wireless communication link.

In one exemplary embodiment, customers 20, print providers 22, and print processing system controller 28 are all located remote from each other (i.e., at different locations). Thus, communications between customers 20 and print processing system controller 28, communications between print providers 22 and print processing system controller 28, and communications between customers 20 and print providers 22 are conducted over Internet communication link 32. Preferably, print providers 22 communicate with print processing system controller 28 via Internet communication link 32. It is, however, within the scope of the present invention for print providers 22 to communicate with print processing system controller 28 in other manners (e.g., a direct connection or communication link).

Print processing system 10, including print processing system controller 28, can be implemented in hardware via a microprocessor, programmable logic device, or state machine, in firmware, or in software within a given device. In one embodiment, at least a portion of the software programming is written in JAVA programming language, and each of the main components communicate via Internet communication link 32 using a communication bus protocol. For example, the present invention may or may not use a TCP/IP protocol suite for data transport. Other programming languages and communication bus protocols suitable for use with print processing system 10 will become apparent to those skilled in the art after reading the present application.

Print processing system controller 28 includes hardware, software, firmware, or a combination of these. In one preferred embodiment, print processing system controller 28 includes a computer server or other microprocessor based system capable of performing a sequence of logic operations. In addition, print processing system controller 28 can include a microprocessor embedded system/appliance incorporating tailored appliance hardware and/or dedicated single purpose hardware.

In one exemplary embodiment, print processing system 10 includes a print processing data storage system 34. Print processing data storage system 34 constitutes a database of one or more data files for print processing system 10. Examples of print processing data storage system 34 include non-volatile memory (e.g., a hard disk drive or other persistent storage device) and may include volatile memory (e.g., random access memory (RAM)). Data is transferred to and from print processing data storage system 34 via print processing system controller 28. It is understood that print processing system controller 28 and print processing data storage system 34 may constitute a central print processing system.

Figure 2:
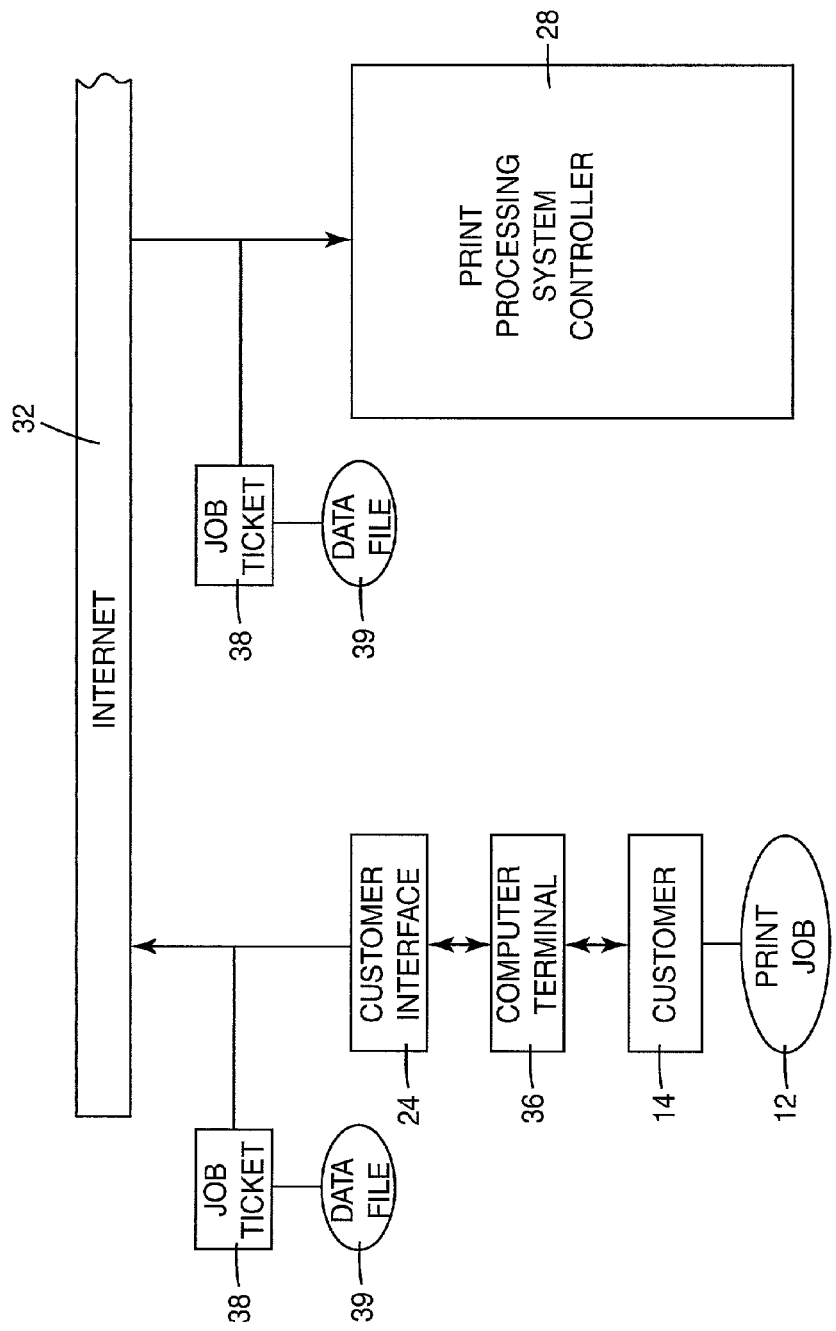
FIG. 2 is a block diagram illustrating one exemplary embodiment of information flow through a portion of the print processing system of FIG. 1.

As illustrated in FIG. 2, customer 14 accesses customer interface 24 of print processing system 10 via a computer terminal 36. Computer terminal 36 may include, for example, an input device such as a keyboard and/or a mouse and a display device such as a monitor, as is well known in the art. In one exemplary embodiment, computer terminal 36 runs an operating system which can support one or more applications. The operating system is stored in memory and executes on a processor. The operating system is preferably a multi-tasking operating system which allows simultaneous execution of multiple applications, although aspects of this invention may be implemented using a single-tasking operating system.

In one exemplary embodiment, customer 14 interacts with customer interface 24 via computer terminal 36 to generate a job ticket 38 for print job 12 and submit job ticket 38 to print processing system controller 28 via Internet communication link 32. As such, print processing system controller 28 receives job ticket 38 from customer 14, processes job ticket 38, and distributes job ticket 38 to print provider 16 as described, for example, in U.S. patent application Ser. No. 09/685,847, assigned to the assignee of the present invention and incorporated herein by reference. Job ticket 38 identifies attributes of print job 12 as specified by customer 14. Job ticket 38, as used herein, is defined to include a list and/or a description of a piece of work requiring production and/or reproduction of printed matter.

In one exemplary embodiment, a data file 39 for print job 12 is associated with job ticket 38. Data file 39 includes a content of print job 12. As such, data file 39 is submitted with job ticket 38 to print processing system controller 28 via Internet communication link 32. Thus, print processing system controller 28 stores data file 39 for print job 12 in print processing data storage system 34 (FIG. 1) for subsequent processing.

In one exemplary embodiment, customer interface 24 includes a plurality of input fields with which customer 14 interacts, via an input device such as a keyboard and/or a mouse of computer terminal 36 or an appliance such as a Personal Digital Assistant (PDA), scanner, camera, etc., to generate job ticket 38 and specify attributes of print job 12. An example of customer interface 24 is described in detail in U.S. patent application Ser. No. 09/685,847, assigned to the assignee of the present invention and incorporated herein by reference.

Figure 3:
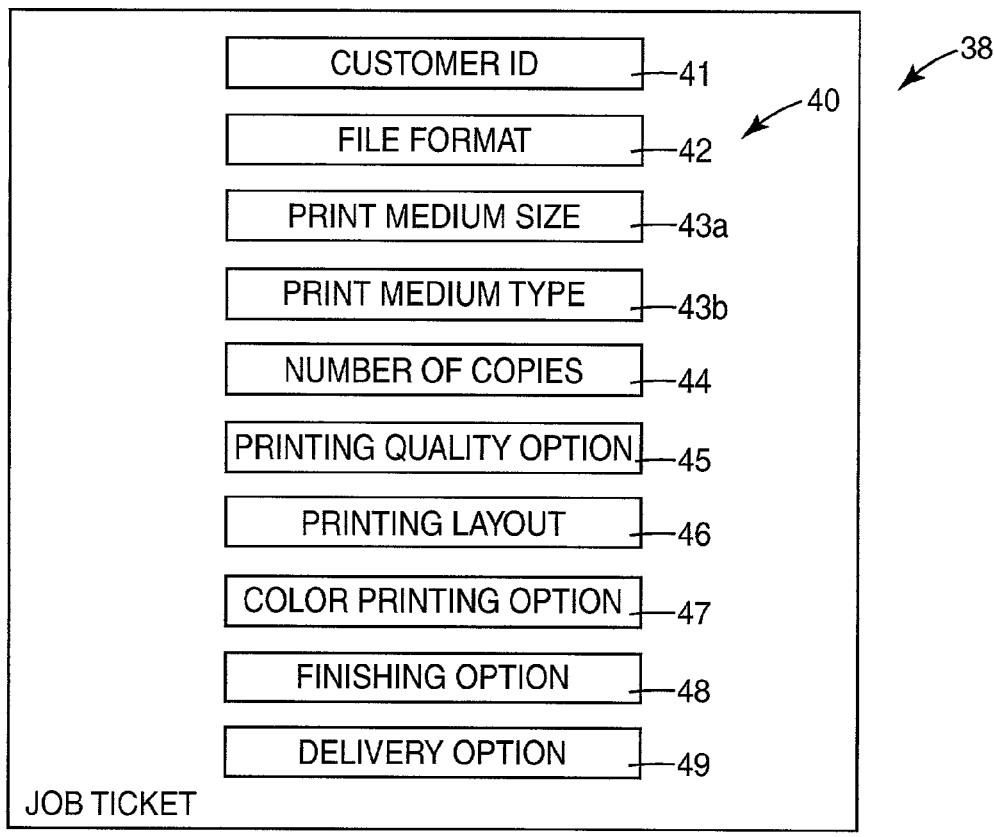
FIG. 3 is a diagram illustrating one exemplary embodiment of a job ticket generated and submitted by a customer with the print processing system of FIG. 1.

In one exemplary embodiment, as illustrated in FIG. 3, job ticket 38 includes a plurality of job ticket attributes 40 which define print job 12. Job ticket attributes 40 coincide with selections as specified by customer 14 while interacting with customer interface 24. As such, job ticket attributes 40 are conveyed to print processing system controller 28 from customer interface 24. Job ticket attributes 40 include, for example, a customer identification attribute 41, a file format attribute 42, a print medium size attribute 43a, a print medium type attribute 43b, a number of copies attribute 44, a printing quality option attribute 45, a printing layout attribute 46, a color printing option attribute 47, a finishing option attribute 48, and a delivery option attribute 49.

Customer identification attribute 41 includes, for example, the name and the address of customer 14. File format attribute 42 includes the format of the file from which print job 12 is to be printed. Print medium size attribute 43a includes a selected or desired size of medium upon which print job 12 is to be printed. Print medium type attribute 43b includes a selected or desired type of medium upon which print job 12 is to be printed. Number of copies attribute 44 includes the number of copies included in print job 12. Printing quality option attribute 45 includes a selected or desired printing quality for print job 12. Printing layout attribute 46 includes a selected or desired layout of how print job 12 is to be printed. Color printing option attribute 47 includes a selected or desired color content for print job 12. Finishing option attribute 48 includes a selected or desired finish to be applied to print job 12. Delivery option attribute 49 includes how and within what time frame print job 12 is to be delivered to customer 14. It is understood that not all attributes need be specified and that additional attributes may be included in job ticket 38.

In one exemplary embodiment, print processing system controller 28 infers or determines a number of job ticket attributes 40 from data file 39 submitted with job ticket 38 for print job 12. Print processing system controller 28 determines, for example, file format attribute 42, print medium size attribute 43a, and printing layout attribute 46 of print job 12 from data file 39. Customer 14, therefore, need only enter those job ticket attributes 40 which are not determined by print processing system controller 28. As such, it is not necessary for customer 14 to enter all job ticket attributes 40.

Figure 4:
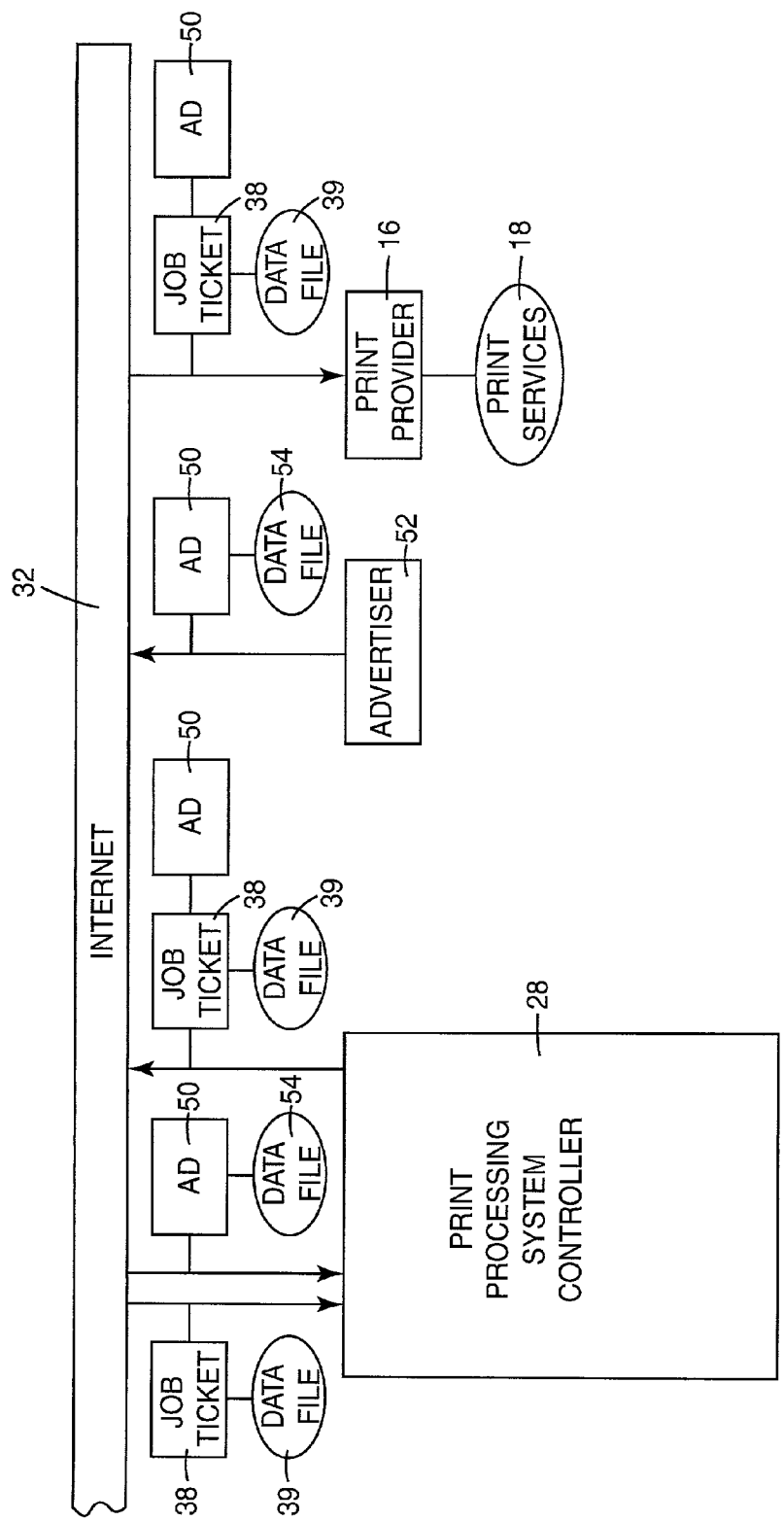
FIG. 4 is a block diagram illustrating one exemplary embodiment of information flow through another portion of the print processing system of FIG. 1.

In one exemplary embodiment, as illustrated in FIG. 4, print processing system controller 28 includes advertising with print job 12. As such, print processing system controller 28 receives, processes, and distributes an advertisement 50 of an advertiser 52. More specifically, print processing system controller 28 associates advertisement 50 with print job 12. In one exemplary embodiment, print processing system controller 28 associates advertisement 50 with job ticket 38 for print job 12 and submits advertisement 50 with job ticket 38 and data file 39 for print job 12 to print provider 16.

In one exemplary embodiment, advertiser 52 is located remote from print processing system controller 28. Thus, communications between advertiser 52 and print processing system controller 28 are conducted over network communication link 30. Preferably, advertiser 52 communicates with print processing system controller 28 via Internet communication link 32. It is, however, within the scope of the present invention for advertiser 52 to communicate with print processing system controller 28 in other manners (e.g., a direct connection or communication link).

In one exemplary embodiment, distribution of advertisement 50 is initiated by advertiser 52 and managed by print processing system controller 28. Advertiser 52 initiates distribution of advertisement 50 by registering advertisement 50 with print processing system controller 28. Advertiser 52 registers advertisement 50 by submitting advertisement 50 to print processing system controller 28. In one exemplary embodiment, advertisement 50 is submitted to print processing system controller 28 via Internet communication link 32. It is understood that advertiser 52 may be one of a plurality of advertisers each offering a respective advertisement and that each advertiser 52 may offer one or more advertisements 50.

In one exemplary embodiment, print processing system controller 28 communicates with and transfers advertisement 50 of advertiser 52 to print processing data storage system 34 (FIG. 1). As such, print processing system controller 28 stores advertisement 50 in print processing data storage system 34 for subsequent retrieval, processing, and distribution. More specifically, when print processing system controller 28 receives advertisement 50 from advertiser 52, advertisement 50 is stored as a data file in print processing data storage system 34. Print processing system controller 28, therefore, subsequently retrieves advertisement 50 from print processing data storage system 34 for processing.

In one exemplary embodiment, advertisement 50 is targeted to print job 12. More specifically, print processing system controller 28 associates advertisement 50 with print job 12 based on data file 39 for print job 12. As such, print processing system controller 28 processes data file 39 and determines which advertisement 50 pertains to and, therefore, should be associated with print job 12. It is understood that advertisement 50 may include one or more advertisements 50 and that multiple advertisements 50 may be associated with print job 12.

To determine which advertisement 50 pertains to print job 12, a data file 54 is associated with advertisement 50. Data file 54 is registered along with advertisement 50 and uploaded to print processing system controller 28 via Internet communication link 32. As such, print processing system controller 28 stores data file 54 along with advertisement 50 in print processing data storage system 34 (FIG. 1) for subsequent processing.

In one exemplary embodiment, data file 54 includes a profile of advertisement 50 such as keywords and/or a theme for advertisement 50. As such, print processing system controller 28 considers data file 39 for print job 12 and data file 54 for advertisement 50 when associating advertisement 50 with print job 12. Thus, print processing system controller 28 processes data file 39 and determines the content of print job 12. More specifically, print processing system controller 28 analyzes the content of data file 39 and determines a profile for print job 12 based on keywords and/or a theme of print job 12.

Print processing system controller 28 compares the content of print job 12 with the profile of advertisement 50 and associates advertisement 50 with print job 12 if the content of print job 12 coincides with the profile of advertisement 50. For example, if advertisement 50 is for a blue jeans manufacturer, data file 54 may identify outdoor activities as being within the profile of advertisement 50. As such, if print processing system controller 28 determines, from data file 29, that the content of print job 12 is related to an outdoor activity, such as horse back riding, print processing system controller 28 associates advertisement 50 with print job 12.

In one exemplary embodiment, print processing system controller 28 associates advertisement 50 with job ticket 38 for print job 12 and distributes job ticket 38 and data file 39 as well as advertisement 50 to print provider 16. Thus, print provider 16 prints advertisement 50 with print job 12. Printing advertisement 50 with print job 12 includes, for example, printing advertisement 50 on a page of print job 12 and/or printing advertisement 50 on a separate page of print job 12. Printing advertisement 50 on a page of print job 12 includes, for example, printing advertisement 50 in a corner, at a top or a bottom, and/or on a back of one or more pages of print job 12.

Figure 5:
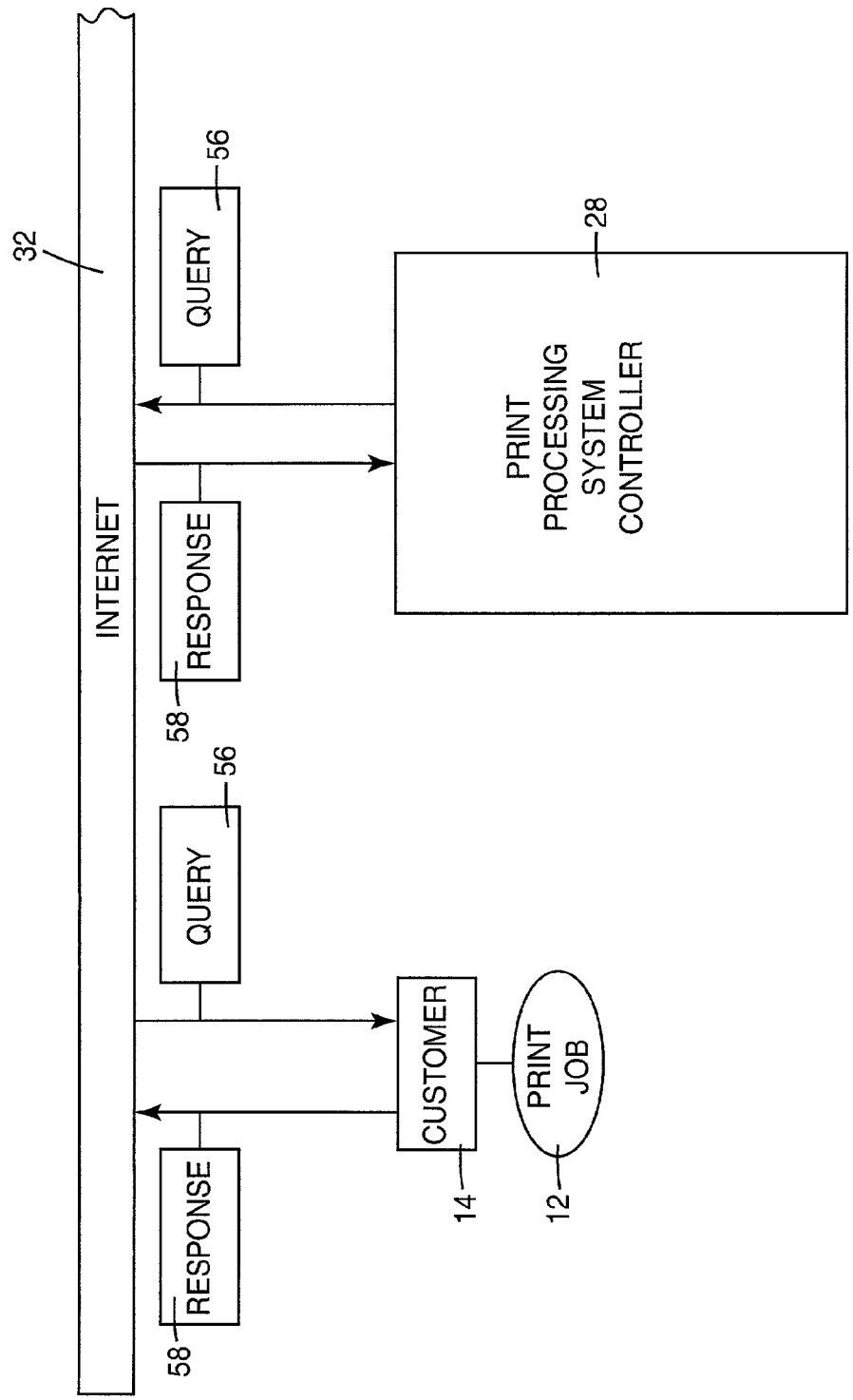
FIG. 5 is a block diagram illustrating another exemplary embodiment of information flow through a portion of the print processing system of FIG. 1.

In one exemplary embodiment, as illustrated in FIG. 5, print processing system controller 28 obtains approval from customer 14 before associating advertisement 50 with print job 12. More specifically, print processing system controller 28 submits a query 56 to customer 14 requesting approval of associating advertisement 50 with print job 12. Thus, customer 14 submits a response 58 to query 56 to print processing system controller 28. Therefore, if customer 14 approves of advertisement 50 being associated with print job 12 and response 58 is favorable, print processing system controller 28 associates advertisement 50 with print job 12, as described above. If, however, customer 14 does not approve of advertisement 50 being associated with print job 12 and response 58 is not favorable, print processing system controller 28 does not associate advertisement 50 with print job 12. In one exemplary embodiment, query 56 is submitted to customer 14 from print processing system controller 28, and/or response 58 is submitted to print processing system controller 28 from customer 14 via Internet communication link 32.

If advertisement 50 is associated with print job 12, advertiser 52 may compensate customer 14 for permitting advertisement 50 to be associated with print job 12 and/or compensate print provider 16 for printing advertisement 50 with print job 12. Thus, printing of print job 12 may be partially or wholly subsidized by advertising.

Figure 6:
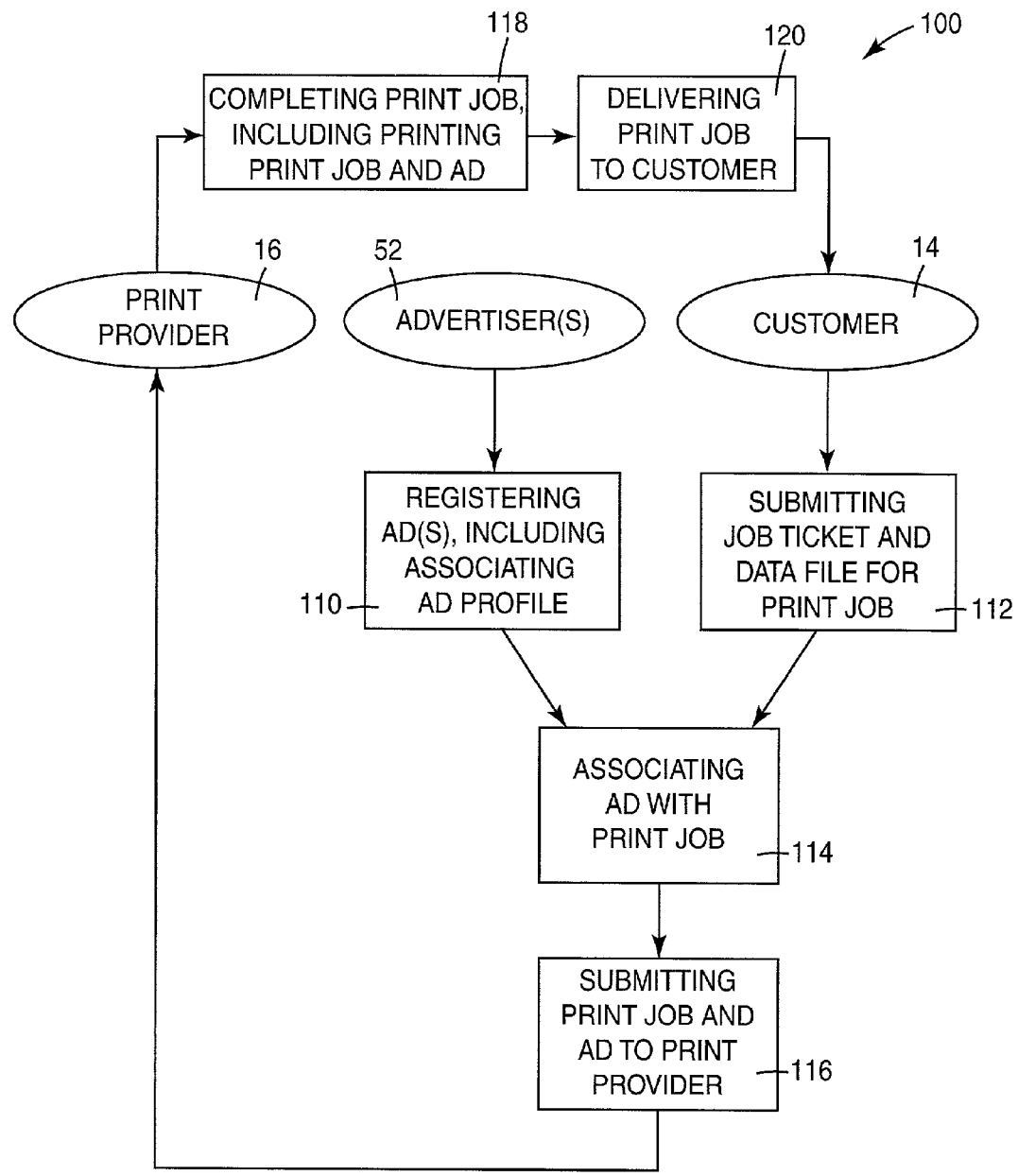
FIG. 6 is a flow diagram illustrating one exemplary embodiment of a method of processing a print job of a customer according to the present invention.

In FIG. 6, a flow diagram illustrating one exemplary embodiment of processing print job 12 and including advertising with print job 12 according to the present invention is illustrated generally at 100. Reference is also made to FIGS. 1-5. At step 110, at least one advertiser 52 registers an advertisement 50, including data file 54, with print processing system controller 28 and, at step 112, customer 14 submits job ticket 38 and data file 39 for print job 12 to print processing system controller 28. In one exemplary embodiment, customer 14 submits job ticket 38 and data file 39 to print processing system controller 28 via Internet communication link 32, as illustrated in FIG. 2, and advertiser 52 registers advertisement 50 with print processing system controller 28 via Internet communication link 32, as illustrated in FIG. 4.

Next, in step 114, print processing system controller 28 associates advertisement 50 with print job 12 and, in step 116, submits print job 12 and advertisement 50 to print provider 16. In one exemplary embodiment, print processing system controller 28 submits advertisement 50 with job ticket 38 and data file 39 for print job 12 to print provider 16 via Internet communication link 32, as illustrated in FIG. 4.

When advertisement 50 of advertiser 52 is registered with print processing system controller 28 in step 110, print processing system controller 28 stores advertisement 50 in print processing data storage system 34, as described above. As such, print processing system controller 28 retrieves advertisement 50 from print processing data storage system 34 when associating advertisement 50 with print job 12 in step 114 and submitting advertisement 50 to print provider 16 in step 116.

Then, in step 118, print provider 16 completes print job 12, including printing print job 12 and printing advertisement 50, and, in step 120, delivers print job 12 to customer 14. Delivery of completed print job 12, including advertisement 50, to customer 14 from print provider 16 is also represented by the dashed line in FIG. 1.

Figure 7:
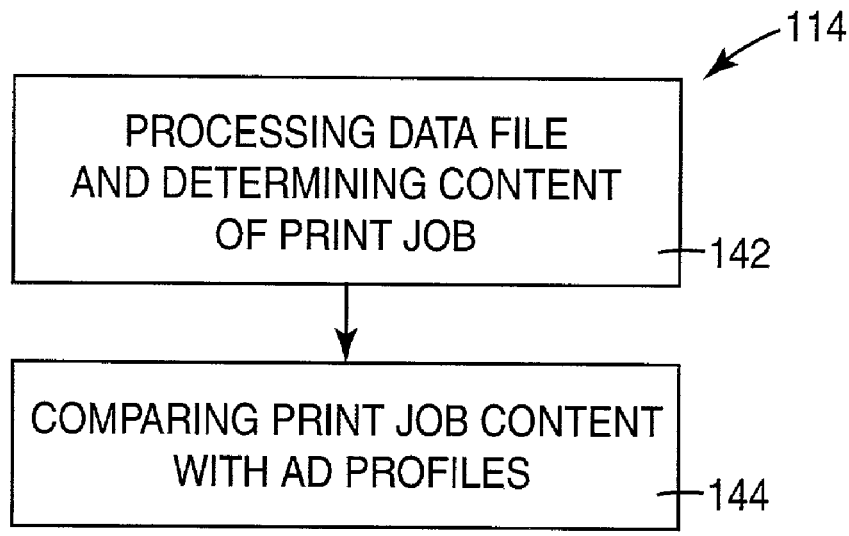
FIG. 7 is a flow diagram illustrating one exemplary embodiment of a method of associating an advertisement with the print job in the method of FIG. 6.

As illustrated in FIG. 7, one exemplary embodiment of the step of associating advertisement 50 with print job 12 in step 114 includes receiving data file 39 for print job 12 and associating advertisement 50 with print job 12 based on data file 39. More specifically, associating advertisement 50 with print job 12 in step 114 includes processing data file 39 and determining a content of print job 12 from data file 39, as indicated in step 142. As such, the content of print job 12 is compared with the profile of advertisement 50, as indicated in step 144. Advertisement 50, therefore, is associated with print job 12 if the content of print job 12 coincides with the profile of advertisement 50, as described above. Advertisement 50, therefore, is related to print job 12.

Figure 8:
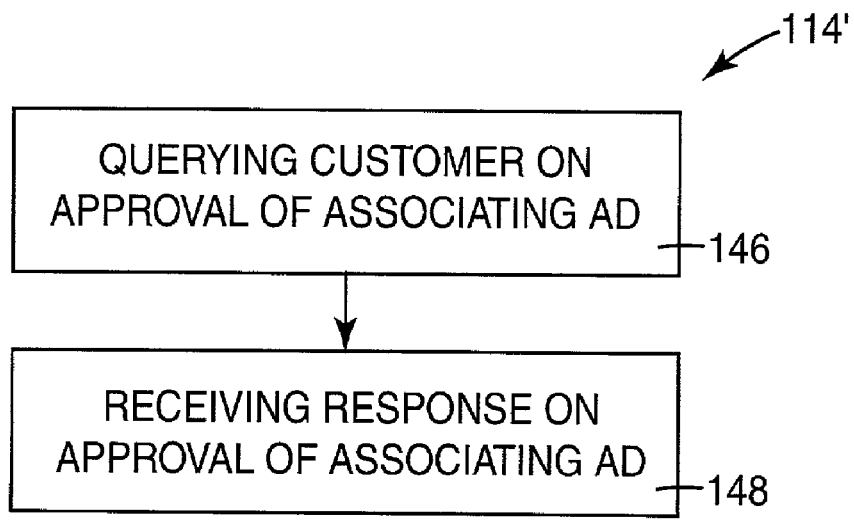
FIG. 8 is a flow diagram illustrating another exemplary embodiment of a method of associating an advertisement with the print job in the method of FIG. 6.

As illustrated in FIG. 8, another exemplary embodiment of the step of associating advertisement 50 with print job 12 in step 114 is illustrated generally at 114' and includes associating advertisement 50 with print job 12 if customer 14 approves. More specifically, associating advertisement 50 with print job 12 in step 114' includes querying customer 14 regarding approval of associating advertisement 50 with print job 12, as indicated in step 146, and receiving a response to the query, as indicated in step 148. Advertisement 50, therefore, is associated with print job 12 if customer 14 approves of advertisement 50 being associated with print job 12, as described above.

By including advertisement 50 with print job 12, print processing system 10 directs advertising to customer 14 as well as other recipients of print job 12. More specifically, print processing system controller 28 receives data file 39 for print job 12 and associates advertisement 50 with print job 12 based on data file 39. As such, print processing system 10 targets advertising to print job 12. In addition, by defining Internet communication link 32 between customer 14 and print processing system controller 28, advertisement 50 can be efficiently and effectively included with print job 12.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of processing a print job of a customer and including advertising with the print job, the method comprising the steps of:

defining a print processing system controller having a plurality of advertisements registered therewith, each of the advertisements having a profile associated therewith;

defining a network communication link between the customer and the print processing system controller;

receiving a data file for the print job from the customer at the print processing system controller via the network communication link;

processing the data file for the print job and determining from the data file a content of the print job;

associating at least one of the advertisements with the print job, including automatically selecting the at least one of the advertisements based on the content of the print job and the profile of the advertisements; and printing the print job;

and wherein the step of associating the at least one of the advertisements includes querying the customer for approval of associating the at least one of the advertisements with the print job and receiving a response thereto, and wherein printing the at least one of the advertisements includes printing the at least one of the advertisements with the print job if the response is favorable.

2. A system for processing a print job of a customer and including advertising with the print job, the system comprising:

a print processing system controller configured to have a plurality of advertisements registered therewith, each of the advertisements having a profile associated therewith, wherein the print processing system controller is adapted to receive a data file for the print job from the customer, determine a content of the print job from the data file, and automatically select at least one of the advertisements for the print job based on the content of the print job and the profile of the advertisements;

and wherein the print processing system controller is adapted to query the customer for approval to associate the at least one of the advertisements with the print job, receive a response thereto, and associate the at least one of the advertisements with the print job if the response is favorable.

* * * * *

UNITED STATES PATENT AND TRADEMARK OFFICE
CERTIFICATE OF CORRECTION

PATENT NO.        : 7,385,717 B2
APPLICATION NO. : 09/734295
DATED             : June 10, 2008
INVENTOR(S)       : George Bradley Hobbs It is certified that error appears in the above-identified patent and that said Letters Patent is hereby corrected as shown below:

In column 7, line 23, delete "comer" and insert -- corner --, therefor.

Signed and Sealed this

Fourth Day of August, 2009

JOHN DOLL
*Acting Director of the United States Patent and Trademark Office*